United States Patent [19]

Potash et al.

[11] Patent Number: 4,467,409
[45] Date of Patent: Aug. 21, 1984

[54] FLEXIBLE COMPUTER ARCHITECTURE USING ARRAYS OF STANDARDIZED MICROPROCESSORS CUSTOMIZED FOR PIPELINE AND PARALLEL OPERATIONS

[75] Inventors: Hanan Potash, La Jolla; Burton L. Levin; Melvyn E. Genter, both of San Diego, all of Calif.

[73] Assignee: Burroughs Corporation, Detroit, Mich.

[21] Appl. No.: 175,430

[22] Filed: Aug. 5, 1980

[51] Int. Cl.³ .................. G06F 9/28; G06F 15/16
[52] U.S. Cl. ........................... 364/200; 364/716
[58] Field of Search ... 364/200 MS File, 900 MS File, 364/716

[56] References Cited

U.S. PATENT DOCUMENTS

| | | | |
|---|---|---|---|
| 3,978,452 | 8/1976 | Barton et al. | 364/200 |
| 4,124,890 | 11/1978 | Vasenkov et al. | 364/200 |
| 4,149,243 | 4/1979 | Wallis | 364/200 |
| 4,156,910 | 5/1979 | Barton et al. | 364/200 |
| 4,177,514 | 12/1979 | Rupp | 364/200 |
| 4,191,996 | 3/1980 | Chesley | 364/200 |
| 4,237,532 | 12/1980 | Borgerson et al. | 364/200 |
| 4,256,926 | 3/1981 | Pitroda et al. | 364/200 |
| 4,268,908 | 5/1981 | Logue et al. | 364/200 |
| 4,276,594 | 6/1981 | Morley | 364/200 |
| 4,285,037 | 8/1981 | Von Stetten | 364/200 |
| 4,305,124 | 12/1981 | Marro et al. | 364/200 |
| 4,309,691 | 1/1982 | Castleman | 364/200 |
| 4,345,309 | 8/1982 | Arulpragasam et al. | 364/200 |
| 4,346,435 | 8/1982 | Wise | 364/200 |
| 4,346,438 | 8/1982 | Potash et al. | 364/200 |
| 4,351,025 | 9/1982 | Hall, Jr. | 364/200 |
| 4,354,228 | 10/1982 | Moore et al. | 364/200 |

*Primary Examiner*—James D. Thomas
*Assistant Examiner*—Archie E. Williams, Jr.
*Attorney, Agent, or Firm*—Charles J. Fassbender; Kevin R. Peterson

[57] ABSTRACT

A flexible architecture for digital computers can be adapted to meet the many different functional requirements of several computer models. Each model includes an array of sequential logic units. These units include respective control memories for storing commands, means for sequentially fetching and executing selectable sequences of the commands, and soft functional structures for performing customized functions in response to the commands. Included within the soft functional structures are a plurality of selectable electrical contacts which customize the functional response of the structures to the commands. Except for these contacts and the content of the respective control memories, the units are substantially identical. All of the units in the array execute respective command sequences from their control memory to perform a single instruction for the computer model.

10 Claims, 11 Drawing Figures

Fig. 3

| | 10a-1 & 10b-1 (TOS) | 10c-1 & 10d-1 (DD) | 10e-1 & 10f-1 (IRW) | 10g (PC) | 10h-1 & 10i-1 (ARITH) | 10j (BIT) | 10k (MASK) | S-BUS | M-BUS |
|---|---|---|---|---|---|---|---|---|---|
| t1 | | | | Broadcast OPCODE | | | | | |
| t2 | | | | Update Code Pointer {New Code Word?} | | | | | |
| t3 | Decode Opcode | Decode Opcode | Decode Opcode | Format next OPCODE | Decode Opcode | | | OPCODE | |
| t4 | Pop TOS lsh {stack under-flow?} | | | Suspend for Op {suspend} | Suspend for Op {suspend} | (same)→(same) | (same)→(same) | | |
| t5 | Pop TOS msh | Load TOS lsh into TEMP 1 | Partition Address Couple {check tag/bit=MRW} | | | | | TOS lsh | |
| t6 | Pop TOS-1 lsh | Load TOS msh into TEMP 2 | send read/write memory addr = D[λ]+6 | | | | | TOS msh | |
| t7 | Pop TOS-1 msh | check tag {check TEMP1} for data | send write data {check tag} | | | | | TOS-1 lsh | |
| t8 | | Suspend for next opcode {suspend} | Send write data | | | | | TOS-1msh | mem. addr = D[λ]+6 |
| t9 | Update stack pointers | | | | | | | | write data lsh |
| t10 | | | | | | | | | write data msh |
| t11 | | | case on read data ⇒ valid tag ⇒ type conversion | | | | | | read data (at mem.addr.) |
| t12 | | | release memory Send OP complete | | | | | | read data (at mem.addr.) |
| | | | | | | | | OP complete | |

Fig. 4A

| | 20a-1<br>INSTRUCTION<br>FETCH UNIT | 20b-1<br>ADDRESS CALC.<br>UNIT #1 | 20d-1<br>EXECUTION UNIT | 20c-1<br>ADDR. CALC.<br>UNIT #2 |
|---|---|---|---|---|
| t1 | ISSUE INSTR FETCH | | | |
| t2 | | WORK ON<br>PRESENT | | |
| t3 | | INSTRUCTION<br>-2 | | |
| t4 | | | | |
| t5 | RCV OPAFBF<br>SEND TO AC#1<br>DECODE OPAFBF | | | |
| t6 | RCV A-ADDR.<br>SEND TO AC#1 | | | |
| t7 | RCV B-ADDR.<br>SEND TO AC#1<br>UPDATE INSTR. PTR. | RCV OPAFBF<br>DECODE OPAFBF | | |
| t8 | | RCV A-ADDR. | | |
| t9 | | RCV B-ADDR.<br>TEST A-ADDR. + AF<br>FETCH IR | | |
| t10 | | TEST B-ADDR. + BF<br>FETCH IND.-L | | |
| t11 | WORK ON | | WORK<br>ON | |
| t12 | NEXT<br>INSTRUCTIONS | | RREVIOUS<br>INSTRUCTIONS | |
| t13 | | RCV IR | | |
| t14 | | RCV INDIRECT-L<br>A+IR | | |
| t15 | | A-ADDR → MC | | |

CONTINUED WITH FIGURE 4B

Fig. 4B

CONTINUING FROM FIGURE 4A

| | 20a-1<br>INSTRUCTION<br>FETCH UNIT | 20b-1<br>ADDRESS CALC.<br>UNIT #1 | 20d-1<br>EXECUTION UNIT | 20c-1<br>ADD.CALC<br>UNIT #2 |
|---|---|---|---|---|
| t16 | | B-ADDR→MC | WORK ON | |
| t17 | | WAIT | PREVIOUS<br>INSTRUCTIONS | |
| t18 | | | | |
| t19 | | | REQ. INFO<br>FROM AC #1 | |
| t20 | | SEND OP, A-LEN,<br>TYPE TO EXEC-U | | |
| t21 | | SEND B-LEN,<br>TYPE TO EXEC-U<br>TASK COMPLETE | RCV OP,<br>A-LEN, TYPE | |
| t22 | | | RCV B-LEN,<br>TYPE, TEST | |
| t23 | WORK ON<br>NEXT | | READ A-OPERAND | |
| t24 | INSTRUCTIONS | | READ B-OPERAND | |
| t25 | | WORK ON<br>PRESENT | | WORK ON<br>PRESENT |
| t26 | | INSTRUCTION<br>+2 | | INSTR.<br>+1 |
| t27 | | | RCV A-OPERAND | |
| t28 | | | RCV B-OPERAND<br>A+B | |
| t29 | | | WRITE A+B | |
| t30 | | | REQ INFO<br>FROM AC #2 | |

Fig. 10

| INSTR. & TIME | FUNCTION | DATA PATH | MATRIX 40 | AU 30 | SH 31 | M42 | M43 |
|---|---|---|---|---|---|---|---|
| STOD t3 | DECADE OP | IR1→M42→M43→CM | DEFINE DATA PATH (CODE A1) | ✗ | ✗ | DEFINE REL. ADDR. X (CODE B1) | RA + PA (CODE C1) |
| STOD t5 | PARTITION ADDR. COUPLE | IR1→SH31→AU30→RAM PA→M33→CM | DEFINE DATA PATH (CODE A2) | MASK BITS Z (CODE D1) | ALIGN BITS Y (CODE E1) | ✗ | PA+1 (CODE C2) |
| ... | ... | ... | ... | ... | ... | ... | ... |
| ADD t10 | TEST B-ADDR. & BF FETCH IND. L | RAM→M42→M43→CM RAM→SH31→AU30→OR1 | DEFINE DATA PATH (CODE A1) | MASK | ALIGN BITS M (CODE E1) | DEFINE REL. ADDR. N (CODE B1) | RA + PA |
| ... | ... | ... | ... | ... | ... | ... | ... |

← UNIT 10e → ← UNIT 20b →

FLEXIBLE COMPUTER ARCHITECTURE USING ARRAYS OF STANDARDIZED MICROPROCESSORS CUSTOMIZED FOR PIPELINE AND PARALLEL OPERATIONS

BACKGROUND OF THE INVENTION

This invention relates to the architecture of digital information processing equipment; and more particularly to the architecture of digital computers.

Typically, a manufacturer of digital computers produces not just one computer type; but instead, it produces several different varieties, or models. These models vary substantially in processing power and price. Basically the various models are needed because customer requirements vary widely. Thus, IBM has produced system 360 models 20, 30, 40, 50, 65, 75, and 90, and now produces system 370 models 125, 135, 138, 145, 148, 155, 158, and 168. All other major manufacturers of digital computers also produce several computer models.

In the past, the various computer models of any one particular manufacturer differed substantially from each other in their architecture. Compare for example, the architecture of the above IBM models 40 and 50 as illustrated at pages 221 and 297 of Microprogramming Principles and Practice, Samir S. Husson, Prentice-Hall Inc., 1970. Compare also the architecture of the NCR Century 100, 200, 300, or the architecture of the Burroughs 4800 and 6800. Each model has its own unique data paths, its own unique functional logic, etc.

From a design engineer's point of view these differences in architecture pose no problem; all that is relevant is whether each model meets its own functional requirements. But from a manufacturing point of view, each model essentially is a separate ensemble of unique parts. Thus, little or no economy is achieved through commonality in design, in fabrication, or in inventory or parts for the various models.

This dissimilarity between models can place very severe strains on a manufacturer's financial resources; because essentially separate design cycles, separate production facilities, and separate inventory need to be provided for each model. And typically, for any one model, these items can cost several million dollars.

Further, from an integrated circuit (IC) manufacturer's point of view, the problem is even more severe. It must supply IC's which meet the diverse functional requirements of the computer models from several computer manufacturers. And typically, no commonality in architecture exists between computer models from different manufacturers. Compare for example, the IBM 370 models to the Burroughs 6800.

Accordingly, a primary object of this invention is to provide an improved architecture for digital information processing equipment which uses "standardized" parts and is flexible enough to adapt to the different functional requirements of any computer model.

BRIEF SUMMARY OF THE INVENTION

These and other objects are accomplished in accordance with the invention by an architecture for multiple digital computer models wherein each model is comprised of an array of sequential logic units. These units include respective control memories for storing commands, means for sequentially fetching and executing selectable sequences of the commands, and soft functional structures for performing customized functions in response to the commands. Included within the soft functional structures are a plurality of selectable electrical contacts which customize the functional response of the structures to the commands. Except for these contacts and the content of the respective control memories, the units are substantially identical. All of the units in the array execute respective command sequences from their control memory to perform a single instruction for the computer model.

BRIEF DESCRIPTION OF THE DRAWINGS

Various features and advantges of the invention will best be understood by reference to the following detailed description and accompanying drawings wherein:

FIG. 3 is a timing diagram illustrating the sequence of which the FIG. 1 embodiment performs a B6800 STOD instruction.

FIGS. 4a–4b are timing diagrams illustrating the sequence by which the FIG. 2 embodiment performs a B4800 ADD instruction.

FIG. 10 is a chart illustrating the relation between the circuits of FIGS. 7, 8, and 9, and the timing diagrams of FIGS. 3 and 4.

DETAILED DESCRIPTION

Figure 1:
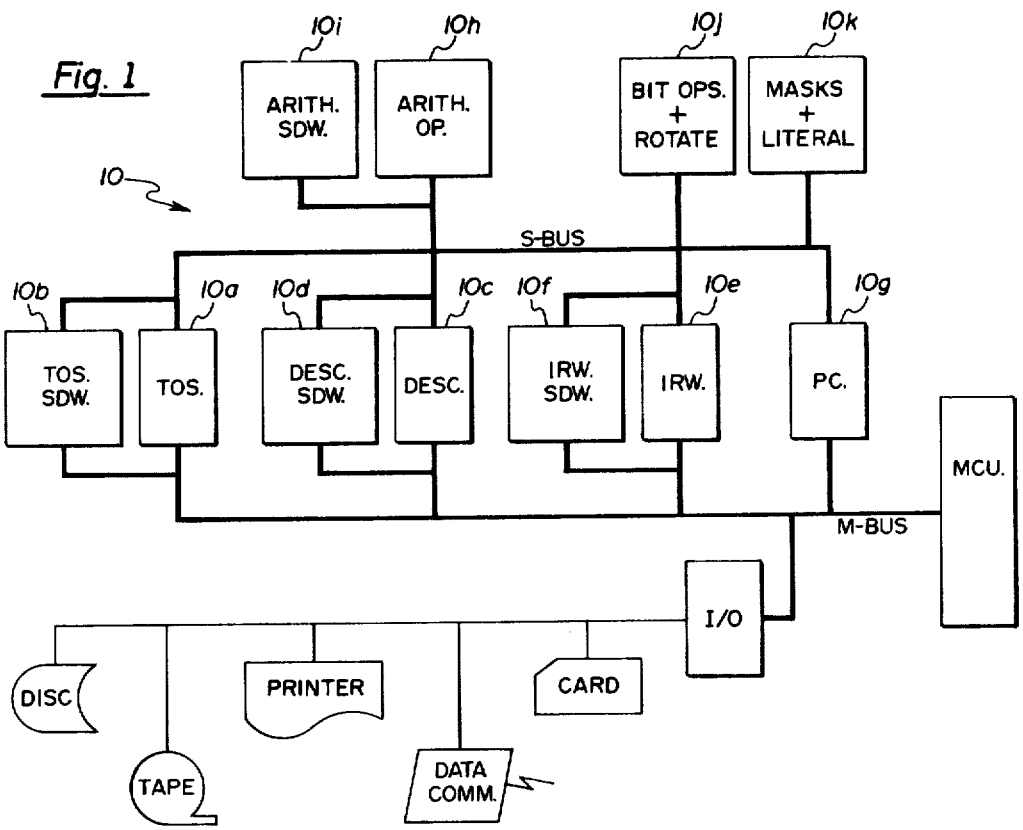
FIG. 1 illustrates an embodiment of one digital computer model which is constructed in accordance with the invention.
Figure 2:
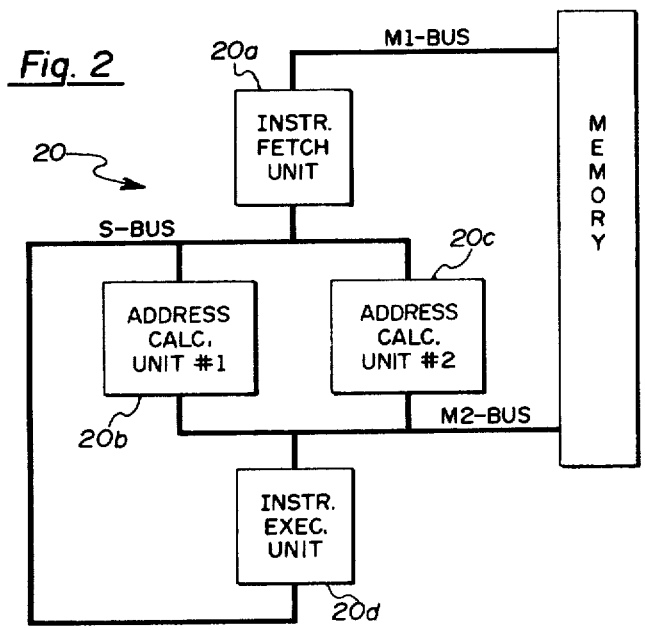
FIG. 2 illustrates an embodiment of another digital computer model which is constructed in accordance with the invention.

Referring now to FIGS. 1 and 2, the details of two digital computer models which are constructed in accordance with the invention will be described. One of the models is indicated in FIG. 1 by reference numeral 10; and the other model is indicated in FIG. 2 by reference numeral 20.

In operation, model 10 performs all of the instructions of the Burroughs B6800 digital computer. These instructions are described in the Burroughs B6800 Information Processing System Reference Manual; and all of the information there contained is herein incorporated by reference.

By comparison, model 20 performs all of the instructions of the Burroughs B4800 digital computer. Those instructions are described in the Burroughs B4800 Information Processing System Reference Manual; and the information there contained is also herein incorporated by reference.

These two instruction sets (i.e.—the instruction sets of the B6800 and the B4800) are totally different and unrelated to each other. For example, the B6800 is a stack oriented processor; while the B4800 is a three address machine. Most of the B6800 operands are received from the stack; and most of its arithmetic results are stored back onto the stack. By comparison, the B4800 receives its operands from and stores its arithmetic results in main memory.

Also, the B6800 executes many of its instructions in conjunction with a variety of "information words" which are specially defined to aid in the processing of ALGOL statements. These information words are termed Data Descriptors (DD), Indexed Word Data Descriptors (IWDD), Indexed String Data Descriptors (ISDD), Normal Indexed Reference Words (NIRW), and Stuffed Index Reference Words Q (SIRW). By comparison, no such information words are processed by the B4800 processor.

Furthermore, in the B6800 processor, many fields are formatted in 48 bit words that have a 3 bit identification tag and a parity bit appended to them. But in the B4800 processor, fields are formatted in groups of six 4-bit digits and they contain no tag.

Now, in accordance with the present invention, the B6800 and B4800 instruction sets are processed by respective arrays of sequential logic units. Computer model 10 contains sequential logic units 10a–10k; and computer model 20 contains sequential logic units 20a–20d. These units are interconnected via busses as illustrated in FIGS. 1 and 2.

Each sequential logic unit includes a control memory for storing commands, and a means for sequentially fetching and executing selectable sequences of those commands. Also, each unit includes thousands of selectable electrical contacts which define various "soft functional structures" that give the units its personality. That is, they define the type of functions which the unit can perform; and they also define the interconnecting data paths within the unit.

These soft functional structures will be described in great detail in conjunction with FIGS. 5–10. For the moment however, suffice it to say that by appropriately choosing the selectable electrical contacts, each sequential logic unit can have its function performing capability tailored to particular tasks; and this tailoring enables the unit to perform its tasks very quickly.

Also, except for the content of their respective control memory and the selectable electrical contacts, each of the units in computer models 10 and 20 are identical to each other. This, of course, is highly desirable because it achieves tremendous economy in design, fabrication, and inventory.

In computer model 10, sequential logic units 10a–10k are assigned the following tasks. Unit 10a basically operates as a stack simulator. It keeps the top two words of the stack in its registers; and it stores all other stack words in memory. But, as far as the rest of the array is concerned, all of the stack "resides" in unit 10a. Each word is 52 bits in length; and one word is partitioned into several registers.

Unit 10a also performs simple operations on the top of stack items. For example, it "pops" items off of the stack and sends them on the S-bus to other units. Also, it receives items from other units and "pushes" them onto the stack. Further, since only the top two words of the stack are held within unit 20a, it performs memory reads and writes to add and delete stack items.

Unit 10b by comparison, performs condition checking on the action taken by unit 10a. For example, unit 10b contains top of stack and bottom of stack address registers; and it utilizes the contents of those registers to determine if the unit 10a memory requests are within bounds. If those bounds are exceeded, a stack overflow or a stack underflow results; and unit 10b signals this condition to unit 10a.

Unit 10c basically operates to evaluate all "Descriptors". That is, it evaluates Data Descriptors, Indexed Word Data Descriptors, and Indexed String Descriptors. Typically, this evaluation involves some arithmetic operations on various bits in the descriptor and results in generating a memory address. Then, unit 10c utilizes the memory address to read or write an item from memory.

Unit 10d checks for various conditions which are associated with the Descriptors. For example, it determines whether the memory addresses which unit 10c forms are within the memory bounds. Also, it determines whether the items which are read from main memory are tagged as expected. For example, an item should be tagged as data if the B6800 instruction that is being performed is an arithmetic instruction.

Unit 10e evaluates all of the above mentioned Reference Words. These include Normal Indirect Reference Words, and Stuffed Indirect Reference Words. Also, it evaluates an Address Couple (AC) in the Value Call instruction. To make these evaluations, unit 10e also keeps track of the current lexicographical level in the program being run. Also, it contains a plurality of D registers which keep track of the beginning of procedures in the program. Unit 10e also reads and writes items in memory which are addressed by the Reference Words.

Unit 10f performs most of the condition checking associated with the Reference Words. For example, it checks address bounds for addresses which are generated by NIRW's, SIRW's, and AC's as described above. Also, it checks the tag on the data which unit 10e reads from memory to determine if it is the expected type.

Unit 10g has the task of fetching instructions from memory, reformatting them so they are directly usable by the other units, and broadcasting the reformatted instruction to all of the units. Also, unit 10g keeps track of the memory address for the next instruction. It also performs some branch instructions directly; and it keeps track of miscellaneous processor states (such as a carry flip-flop, a true/false flip-flop etc.) which are changed upon the execution of an Enter or Exit instruction.

Unit 10h carries out most of the arithmetic steps in an arithmetic instruction. For example, it performs a plurality of add and subtract steps in executing a B6800 Multiply or Divide instruction. Operands for those instructions are supplied by units 10a, 10c, or 10e.

Unit 10i checks the action which is taken by unit 10h. For example, it determines if the data which unit 10h is being sent as an operand is double precision or single precision. Single precision operands are used much more frequently than double precision operands; and unit 10h can perform its arithmetic operations much more quickly if it simply assumes that it is operating on single precision operands. Unit 10i then signals unit 10h if the operands are double precision.

Unit 10j performs substantially all of the bit oriented instructions. These include Bit Set/Reset, Transfer While Greater or Equal, Transfer While Greater Destructive, etc. Thus, the soft functional structures within unit 10j are tailored to perform bit manipulations such as shifting and rotating.

Unit 10k provides masks and literals which are used in conjunction with the execution of a variety of B6800 instructions. These instructions include for example, all Field Transfers and Field Inserts.

From the above description, it should be evident that units 10a–10k each have totally different functional requirements. And these different requirements can only be performed efficiently by tailoring the functional capability of each unit.

Also, the functional requirements of units 10a–10k are totally different than the functional requirements of units 20a–20d in computer model 20. In that model, unit 20a has the task of fetching instructions from the memory. Then, it alternately sends the fetched instruction to either unit 20b or 20c. Also, these B4800 instructions vary in length; and thus during the instruction fetching operation, unit 20a must determine each instruction's format.

Units 20b and 20c compute the operand addresses for the instructions that they receive. These address calculations can involve index registers, or indirect addressing. In either case, memory reads need to be performed. Also, units 20b and 20c determine the length of the operands; and this determination may also involve addressing the memory.

Finally, unit 20d alternately receives instruction opcodes and operand addresses from units 20b and unit 20c; and it performs arithmetic operations on the addressed operands. Unit 20d also reads the addressed operands from memory and stores the result back in memory.

Turning now to FIG. 3, the manner in which logic units 10a–10k perform B6800 instructions will be described in further detail. In particular, that Figure illustrates the command sequences which logic units 10a–10k simultaneously perform to execute one B6800 STORE DESTRUCTIVE (STOD) instruction.

However, in order to even begin to understand the illustrated command sequences, and the functions which each unit is performing, it first is necessary to further explain Data Descriptor, Indexed Word Data Descriptor, Indexed String Data Descriptor, Normal Indirect Reference Word, and Stuffed Indirect Reference Word. Each of these items are fifty-two bits long; and they vary the particular action that is taken during the instruction's execution.

Basically, a Data Descriptor defines an array of data. Bits 19-0 specify the base addresss of the array; and bits 39-20 specify the number of items in the array. Each of these items can be either a single precision word, a double precision word, a hexadecimal character, or an EBCDIC character. These are respectively specified by bits 42-40 being equal to 0, 1, 2, or 4.

Bit 43 being equal to 1 indicates the array can only be read from but not written into. Bit 47 being equal to 1 indicates the array is in main memory. And bits 50, 49, 48, and 45 are a code which identifies the Data Descriptor.

An Indexed Word Data Descriptor points to one particular item in an array of single precision or double precision words. Bits 19-0, 43, and 47 are as defined above. Bits 32-20 specify the number of the referenced item in the array relative to the base address. Bits 50, 49, 48, 45, 42, 41, and 40 are codes which identify the Indexed Word Data Descriptor and its content as being either single or double precision.

Similarly, an Indexed String Data Descriptor points to one particular item in an array of hexadecimal or EBCDIC characters. Bits 50, 49, 48, 45, 42, 41, and 40 are codes which identify the indexed string data descriptor and its content as being either hexadecimal or EBCDIC. And bits 19-0, 43, 47, and 32-20 are as defined for the indexed word descriptor.

A Normal Indirect Reference Word and a Stuffed Indirect Reference Word both specify a memory address. They are identified by a code of bits 50, 49, 48, and 46. In a Normal Indirect Reference Word, the memory address is the content of a "D" register (as specified by one portion of bits 13-0) plus an offset (which is specified by another portion of bits 13-0). One "D" register exists for each lexicographical level in the program to be executed.

With a Stuffed Indirect Reference Word, the memory address is the content of a base register plus an offset value plus a displacement value. Bits 12-0 and 35-16 respectively define the offset and displacement.

Now in the STOD instruction itself, a reference chain (which begins in the stack) is evaluated in order to store some item from the stack (the store object) into a data word target location in main memory. The initial reference chain item is either an IRW chain or an IWDD; and the data word target location in main memory is either a data type operand, tag 4 word, or an uninitialized operand. An IRW chain, in turn, can point to an IWDD, a PCW or a target item. Evaluation of an IWDD will result in either another IWDD or a target item. Evaluation of a PCW can again point to an Initial Reference item, which must then be evaluated as described above.

The Initial Reference is assumed to be the top item of the stack and the store object the second item. But if the top item is a Data Word, (a word with tab bits 50, 49, and 48 being even) the second item is assumed to be the Initial Reference. Note that a Data Word store object and the Initial Reference may be in either order, but if the store object has an odd tag, the Initial Reference list will be the top item and the store object the second item.

If the top of stack item is not a Data Word or an Initial Reference, or if the top item is a Data Word and the second item is not an Initial Reference, an Invalid Stack Argument interrupt is generated. If any reference evaluation produces a tag 3 item or an IWDD is marked read-only, a Memory Protect interrupt is generated. If reference evaluation produces an item otherwise not a valid result according to the above chain evaluation rules, an Invalid Reference Chain interrupt is generated.

The store object is written into the target location. Note that normal store evaluation operators will not write into a location containing an odd tagged word. Both the Initial Reference and the store object are deleted from the stack.

Type conversion between double precision operands and single word items (single precision operands, tag 4 words, uninitialized operands) depends on the type of the store object (the store type) and the type associated with the target location (the target type). The target type is determined as follows: if one or more IWDD's are evaluated, the target type is the element size value of the last IWDD; otherwise, the target type is single word if a single word item is currently stored in the target location and double precision if a double precision operand is in the target location.

If the store type is double precision and the target type is single word, a SNGL (set to single precision, rounded) operation is performed on the store object, and the resultant single precision operand is stored into the target location.

If the store type and the target type are double precision, both words of the store object are stored into the target locations. If the store type is single word and the target type is double precision, the single word store object is extended to double precision by changing its tag and appending a second word initialized to zero. Both words of the pair are stored into the target locations. Where two double precision words are written, if the second (adjoining) target location contains an odd tagged word, a Memory Protect interrupt is generated.

Consider now the command sequence of FIG. 3. In that figure, columns 10a-1 through 10k-1 respectively indicate the command sequences which units 10a–10k perform in executing the STOD instruction. Commands shown in brackets are executed by units 10b, 10d, and 10f. Time intervals t1–t13 indicate the sequences of these commands.

During time interval t1, unit 10g determines that an instruction execution should begin. That instruction is then broadcast on the system bus during time interval t2; and from there it is received by all of the units.

Thereafter, during time interval t3, all of the receiving units decode the STOD instruction to determine which instruction it is. Based on this decode, units 10h, 10i, 10j and 10k determine that they are not involved with the execution of this particular instruction; and they therefore suspend further command execution until the next instruction is broadcast by unit 10g on the system bus.

By comparison, units 10a–10f each determine that they have further command sequences to perform in the execution of this instruction. In particular, unit 10a has the task of sending the top two words in the stack to units 10c–10f. These two words contain the initial reference and the store object as was described above. Thus, during time intervals t4, t5, t6, and t7, unit 10b uses the S bus to transmit the least significant half of the top of stack (TOS), the most significant half of the TOS, the least significant half of the TOS-1, and the most significant half of the TOS-1.

Units 10c–10f receive this data from the S bus during time intervals t5-t8. If the TOS contains the store object and the TOS-1 contains the data descriptor, then this instruction is performed by units 10e and 10f. However, if the TOS contains an IRW and the TOS-1 contains the store object, then this instruction will be performed by units 10c and 10d.

Also, unit 10c executes its commands without first checking to see if the store object is in the TOS and the data descriptor is in TOS-1. Instead, the check for those conditions is performed by unit 10d.

If they do not exist, then unit 10d interrupts the command sequence of unit 10c. By this mechanism, the execution time of the instruction is shortened over that of which it would be if the checks were made before the taking of any substantive action.

Similarly, unit 10e performs its command sequence under the assumption that the TOS contains an IRW and the TOS-1 contains the store object. At the same time, unit 10f performs various checks to determine whether this condition in fact exists. If it does not, then unit 10f interrupts the command sequence of unit 10e.

Thus, during time interval t5, unit 10e partitions the least significant half of the TOS word as it it were an address couple. Then during time interval t6, unit 10e sends a read/write command on the M bus to the memory. That memory address equals the D register (as specified by the λ portion of the above address couple) plus the δ portion of that address couple. Then during time intervals t7 and t8, unit 10e sends the TOS-1 word as write data to the memory.

All of these actions, however, of unit 10e are dependent upon the checking that is performed by unit 10f. This checking is indicated in FIG. 3 within brackets. Thus, during time interval t6, unit 10f checks the tag bits of the top of stack word to determine if in fact it is a store object. And during time interval t7, unit 10f checks the TOS-1 word to determine if in fact it is a data descriptor. If they are not, then unit 10e is interrupted and another command flow sequence (not shown) is executed.

Based on the analysis of various programs, the probabilities are very low that the conditions for which unit 10f checks will occur. Thus in normal cases, unit 10e will not be interrupted, and therefore the STOD instruction will be executed relatively quickly. Unit 10f also must perform its checking for abnormal conditions relatively quickly. But those STOD instruction variations which unit 10f checks for are actually performed by another flow sequence in a much slower fashion.

Continuing on now with the normal flow sequence of unit 10e, that unit awaits for the data which was previously stored at the memory location to which it wrote. That data is sent by the memory control unit on the M bus during time intervals t10 and t11. Then during time interval t11, unit 10e compares the tag of the data which it wrote to the tag of the data which is read to determine whether or not any "type conversion" as described above is required. Also, a determination is made as to whether the tag of the store location is valid.

If these conditions are met, unit 10e sends an op complete code to unit 10g during time interval t12. Unit 10g then responds to this op complete message by broadcasting the next high level instruction to all of the units as has been described above. That next instruction is formatted during time intervals t2–t4. A memory read is also performed by unit 10g during those time intervals if it is needed to obtain the next instruction.

Turning now to the operation of units 10c and 10d, FIG. 3 shows that during time interval t5, unit 10c loads the least significant half of the TOS into a register TEMP1. Then during time interval t6, unit 10c loads the most significant half of the TOS into another register TEMP2. Next, during time interval t7, unit 10c checks the most significant half of the TOS-1 word to determine if it is a data descriptor. Also, unit 10d checks TEMP1 to determine if it is a valid store object. In the illustrated example, these conditions do not exist, and thus units 10c and 10d suspend further operation until the next instruction is broadcast by unit 10g.

Next, referring to FIG. 4, the detailed microcode flow for one of the instructions which the FIG. 2 embodiment performs will be described. That instruction is a B4800 ADD instruction; and its format is as follows. Digits 1 and 2 are the OPCODE; digits 3 and 4 are an AF field; digits 5 and 6 are a BF field; digits 7–12 are an A address field; and digits 13–18 are a B address field.

Basically, in response to this instruction, the contents of memory at the A address are added to the contents of memory at the B address; and the result is stored in memory at the B address. However, several variations on this basic operation are possible. For example, if the two most significant bits of digit 7 equal 01, 10, or 11, then the contents of index register 1, 2, or 3 respectively must be added to the A address. No indexing occurs if those bits equal 00.

Also, if the two least significant bits of digit 7 equal 00, then the data at the A address is treated as unsigned four bit data; but if those same two bits equal 01, then the data at the A address is treated as signed four bit data; and if they equal to 10, then the data at the A address is treated as unsigned eight bit data.

Further, if the two least significant bits of digit 7 are equal to 11, then the data at the A address is not an operand; but instead, it is the address of an operand. This is called indirect addressing; and it can be repeated to any level.

Similar variations also occur on the B address. That is, the two most significant bits and the two least significant bits of digit 13 are interpreted as described above, but only with reference to the B address.

Also, the AF field modifies the meaning of the A operand. Normally, digits 3 and 4 are decimal numbers which range between 0 and 9; and in that case they specify the length of the A operand. However, if the two most significant bits of digit 3 equal 11, then an indirect field length is specified; and the address of that indirect field length is formed by adding the two least significant bits of digit 3 (as a ten's digit) with digit 4 (as a units digit) and with the contents of a base register.

Further, if digit 3 equals 1010, then the A address field is not interpreted as a memory address; but instead, it is interpreted as a literal. In that case, digits 7–12 form A-operand of the ADD instruction. Also, as before, the BF field is interpreted similarly to the AF field, but only with reference to the B operand.

Now, to understand how this instruction is performed by the array of FIG. 2, consider the chart of FIG. 4. In that chart, column 20a-1 lists the microcommands which unit 20a performs. One microcommand is performed during time interval t1; another microcommand is performed during time interval t2; etc. Similarly, columns 20b-1, 20c-1, and 20d-1 respectively indicate the microcommand sequences that are performed by units 20b, 20c, and 20d.

To begin the ADD instruction, unit 20a issues a fetch command to the memory controller. This occurs during time interval t1. In response thereto, the memory controller fetches and sends the instruction back to unit 20a on memory bus 1. Time intervals t2–t6 are utilized by the memory controller to perform this operation.

During time interval t5, unit 20a receives the OP, AF, and BF portions of the instruction. Also in that time interval, unit 20a sends these fields to address calculator unit 20b; and it further decodes these fields to determine the instruction's format.

Next, during time interval t6, unit 20a receives the A-address field and passes it to address calculator unit 20b. Then during time interval t7, unit 20a receives the B-address field, and sends it to address calculator unit 20b. Also during time interval t7, unit 20a updates the instruction address pointer based on the ADD instruction's format. Then, during the next time interval, unit 20a begins to fetch the next instruction in sequence.

Unit 20b then begins its execution of the ADD instruction during time interval t7. During that time interval, unit 20b receives the OP, AF, and BF portions of the instruction. Also, it decodes those instruction portions to determine the instruction's format, and branches to a corresponding routine.

Then during time interval t8, unit 20b receives the A-address field of the instruction; and during time interval t9, it receives the B-address field of the instruction. Also during time interval t9, unit 20b decodes the AF field and the digit 7 of the A-address field. Based on that decode, a determination is made that indexing is required; so the specified index register is read from memory.

Similarly, during time interval t10, unit 20b decodes the BF and digit 13 of the B-address field. Based on that decode, a determination is made that an indirect field length is specified. Accordingly, unit 20b forms a memory address and performs a memory read to fetch the actual length of the B field.

During time interval t11, the index register is received; and during time interval t12, the actual B field length is received. Also during time interval t12, unit 20b adds the index register to the A-address field.

Next, during time interval t13, unit 20b sends the address of the A operand to the memory controller. Then during time interval t14, unit 20b sends the address of the B operand to the memory controller. These addresses are subsequently utilized by the memory controller in response to commands from execution unit 20e.

At this point, unit 20b waits for a request for data from the execution unit 20e. In the illustrated example, this waiting occurs during time intervals t17–t19. Then during time interval t19, execution unit 20d completes the execution of the preceding instruction; and so it requests more data from unit 20a. In response to this request, unit 20b sends the Opcode, A field length and data type, and B field length and data type to the execution unit. This occurs during time intervals t20 and t21. Also, during time interval t21, unit 20b signals the instruction fetch unit 20a that it is free to start address calculations on another instruction.

Next, beginning at time interval t21, unit 20b begins its execution of the ADD instruction. During time interval t21, unit 20e receives the OP, A length, and A type. Then during time interval t22, unit 20a receives the B-length and B-type information. Also, it tests the field lengths and data types; and based on that test, branches to a specialized routine.

Thereafter, during time intervals t23 and t24, operands at the A address and B address are read from the memory. This reading is initiated by commands from unit 20d. Thereafter, the A operand is received by unit 20d during time interval t27; and the B operand is received during time interval t28. Also during time interval t28, unit 20d adds the two operands together.

Then during time interval t29, unit 20d stores the result of the ADD operation in main memory; and sets appropriate status bits, such as carry indicator. Finally, during time interval t30, unit 20d signals address calculator unit 20c that it is ready to begin processing the next instruction.

Now, in order for the arrays of FIGS. 1 and 2 to perform the various operations depicted in FIGS. 3 and 4 respectively, it is necessary that each sequential logic unit have a customized function performing capability. That is, each unit must be able to perform a variety of unique tasks in only one time cycle. For example, by inspection of column 10e-1, time t5 of FIG. 3, it is evident that in one cycle, unit 10e must be able to partition the address couple field into its component parts $\lambda$ and $\delta$.

Alternatively, this partitioning could be achieved by a series of standard one-bit shifting and masking steps; but that would increase the execution time of the instruction being performed. A problem then is how to customize the one-cycle task performing capability of each of the units; and at the same time, provide for substantial commonality among the units-thereby achieving economy in design, fabrication, and inventory.

Figure 5:
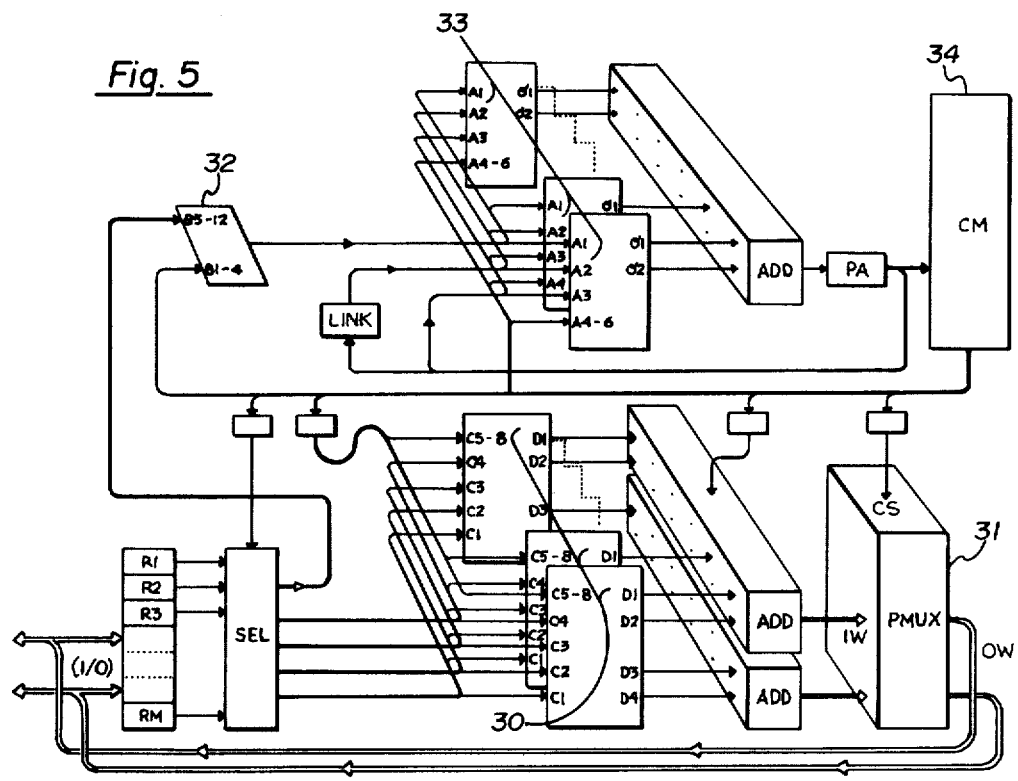
FIG. 5 illustrates one preferred embodiment of a sequential logic unit for incorporation within the digital computer models of FIGS. 1 and 2.
Figure 6:
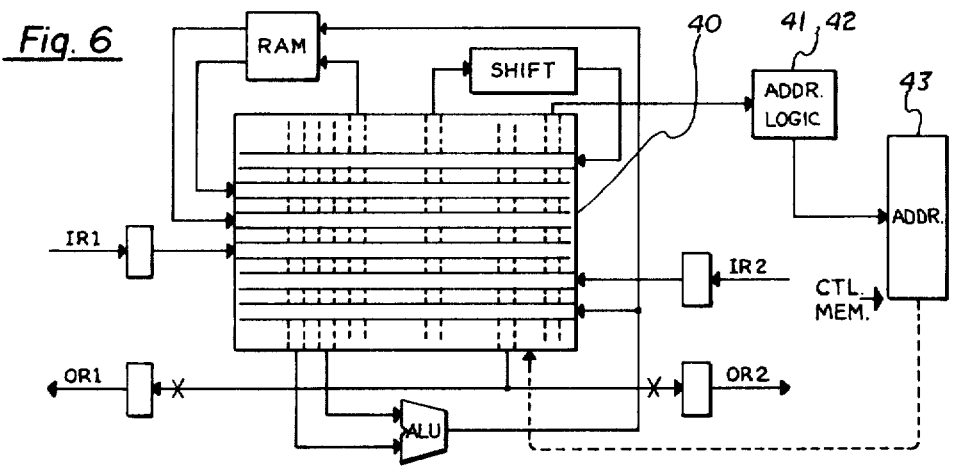
FIG. 6 illustrates another preferred embodiment of a sequential logic unit for incorporation within the digital computer models of FIGS. 1 and 2.

In the present invention, this problem is solved by constructing all of the sequential logic units of FIGS. 1 and 2 in accordance with FIGS. 5 and 6. Basically, the sequential logic unit of FIG. 5 has a sophisticated computation performing capability; whereas the sequential logic unit of FIG. 6 has a sophisticated parallel processing capability. But these capabilities are implemented in a very "soft" architecture which enables them to be readily customized to a particular task.

In regard to the FIG. 5 and FIG. 6 embodiments, all of the teachings of copending U.S. patent application Ser. No. 087,666, entitled "Digital Computer Having Programmable Structure", by Hanan Potash et al filed Oct. 24, 1979 which is now U.S. Pat. No. 4,346,438, and copending U.S. patent application Ser. No. 162,057, entitled "Digital Device with Interconnect Matrix", by Melvyn E. Genter et al Genter filed June 23, 1980 which is now U.S. Pat. No. 4,327,355 are herein incorporated by reference. Those applications describe FIGS. 5 and 6 in detail as individual stand-alone data processors.

For the purposes of this system application, only those functional structures within FIGS. 5 and 6 which provide a level of "softness" or flexibility need be expanded upon here. These soft functional structures are indicated in FIG. 5 by reference numerals 30, 31, 32, and 33; and are indicated in FIG. 6 by reference numerals 40, 41, 42, and 43. Structures 32 and 33 are identical to structures 42 and 43; so the latter are only illustrated as a single box.

Structure 30 is comprised of a plurality of memories as illustrated. These memories can be read-write or read-only memories. Each memory has two address inputs labeled C1–C4 and C5–C8. Data bits of like power are applied to address inputs C1–C4; while a single set of control signals is applied in parallel to address inputs C5–C8. By this structure, any type of arithmetic or logical transformation can be performed on the bits applied to address inputs C1–C4. Each particular transformation is specified by the content of the memories 30; and in the special case of read-only memories, that content translates to a set of electrical contacts.

Structure 31 is a means for enabling any bit of an input word IW to be transposed onto any other bit or bits of an output word OW. Thus it enables various fields to be concatenated or partitioned. Each particular type of transposition to be done is customized by specifying a plurality of selectable electrical contacts within structure 31. Then, during operation, those transpositions are selectively performed in response to a set of control signals CS.

Structures 32 and 33 are a means for providing flexibility in the unit's testing and branching capability. In particular, structure 32 provides a means to horizontally translate any field or fields into an address; and structure 33 provides a means to modify that address by any type of arithmetic or logical operation. Each particular type of transformation which structures 32 and 33 perform is selectable by a memory content; which again in the special case of a read-only memory, is implemented by a set of electrical contacts.

A control memory 34 is provided to store commands which direct the operation of structures 30, 31, 32, and 33. These commands can be vertical (i.e.—a single encoded field) or can be horizontal (i.e.—have several independent fields). One command specifies the operations to be performed in one cycle time. Similarly, structure 43 is a control memory which directs the operations to be performed by structures 40, 41, and 42.

Structure 40 provides a means for customizing interconnecting paths among a variety of other "black boxes". For example, during one time cycle, the RAM output can pass through the arithmetic logic unit (ALU), then through the shifter, and back to the RAM; while during the next time cycle, input register #1 can pass through the shifter, then through the ALU then to the RAM. Each of the interconnecting paths is customized by a set of selectable electrical contacts.

In one preferred embodiment, the ALU and shifter of FIG. 6 also have the "soft" structure as described above in FIG. 5. In that case, the ALU is constructed as structure 30; and the shifter is constructed as structure 31. This composite unit is then customized to meet the functional requirements of units 10a–10k in FIG. 1, and units 20a–20d in FIG. 2. Alternatively, those units can be made to differ from each other in the particular soft structures 30, 31, 32, 33 and 40 which they incorporate. For example, units 10i–10k and 10a–10g may be constructed as illustrated in FIGS. 5 and 6 respectively.

Preferably, each sequential logic unit is constructed on a single semiconductor substrate. That substrate optionally consists of either one chip or one wafer. In either case however, all of the above described flexibility is achieved by merely altering a single mask. Accordingly, the simultaneous goals of customized sequential logic units, and commonality in design-fabrication-and inventory are achieved.

Figure 7:
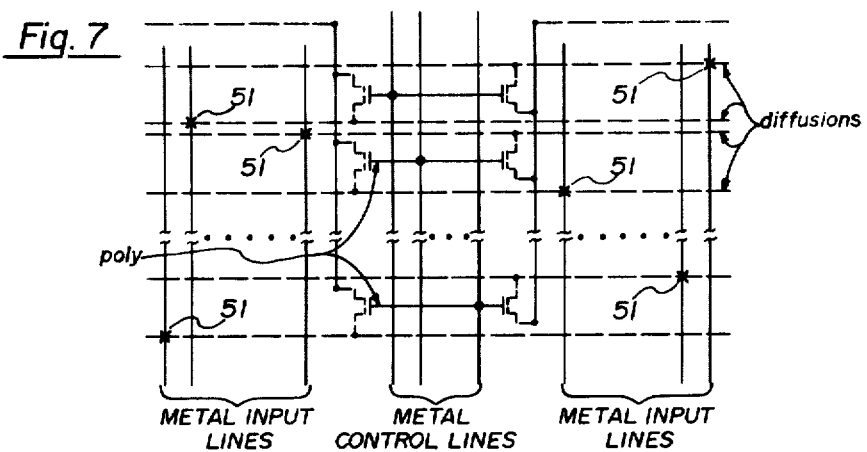
FIG. 7 is a detailed circuit diagram of a programmable multiplexor in the sequential logic unit of FIG. 5.
Figure 8:
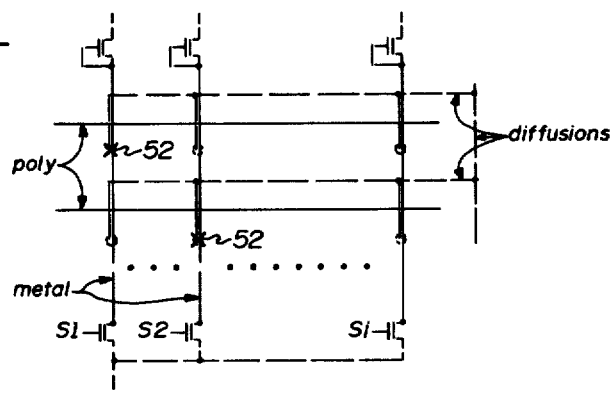
FIG. 8 is a detailed circuit diagram of a programmable memory in the sequential logic units of FIGS. 5 and 6.
Figure 9:
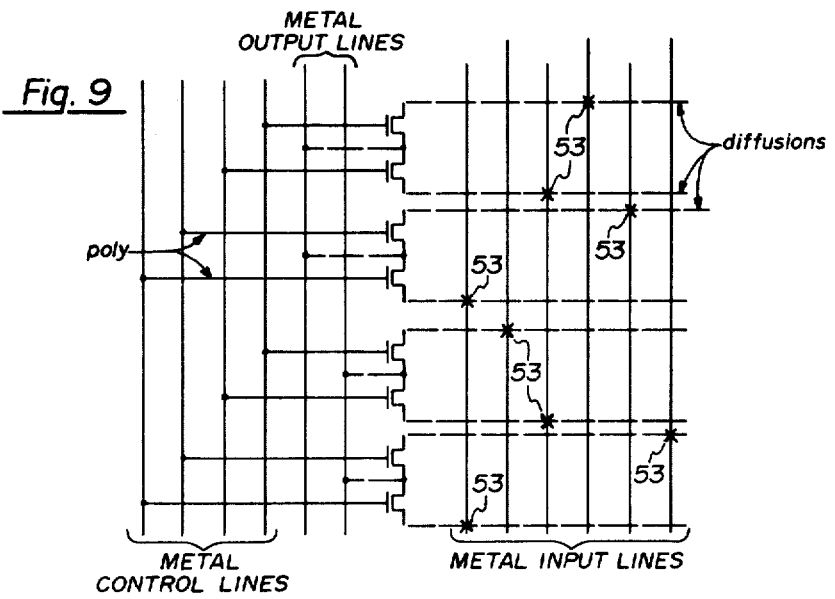
FIG. 9 is a detailed circuit diagram of a programmable interconnect matrix in the sequential logic unit of FIG. 6.

To further elaborate on this point, consider now the physical layout diagrams of FIGS. 7, 8, and 9. Basically, FIG. 7 shows a physical layout for a portion of structure 31; FIG. 8 shows a physical layout for a portion of the memory structures; and FIG. 9 shows a physical layout for a portion of structure 40.

In these Figures, all dashed lines are patterned diffusions lying at one surface of the semiconductor substrate; all solid horizontal lines are patterned polysilicon lying on an insulating layer over the one surface; and all solid vertical lines are patterned metal lying on another insulating layer over the polysilicon.

All of the functions which these circuits perform are customized by choosing the plurality of electrical contacts 51, 52, and 53. Also, each of these contacts occur between a metal line and a diffusion. Thus, only a single mask—the one which defines the holes in the insulating layers between the diffusions and metal lines where contacts are to be made—needs to be specially made in order to completely define a logic unit's personality.

Turning now to FIG. 10, the details of making the transition from the code of FIGS. 3 and 4 to the contacts of FIGS. 7, 8, and 9 will be described. To begin, assume that the code for the most frequently used instructions is complete. That is, assume a chart similar to FIG. 3 or 4 has been made for each instruction whose execution time will significantly affect the overall performance of the array.

At that point, all of the functions which a particular unit must perform in executing those instructions are tabulated as illustrated by the two left-most columns of FIG. 10. In that Figure, some of the functions performed by unit 10e are tabulated as an example.

Next, separate columns are provided to the right of the above two for listing the data paths through connect matrix 40 and the operation of arithmetic unit 30, shifter 31, memory 42, and memory 43. Here it is assumed that the particular sequential logic unit being considered (i.e.—unit 10e) has incorporated all of these soft functional structures.

Next, these columns are filled in to describe how the specified functions are performed by the soft structures in the unit. For example, consider row 1 of FIG. 10. It indicates that the "Decode Op" function will be performed in unit 10e by having connect matrix 40 form a data path of IR1→M42→M43→CM. Also, memory 42 will be required to input the opcode and output a relative address for each opcode. Further, memories 43 will be required to add the above relative address to the present address PA of the control memory. An arbitrary control code is then assigned to specify each of these functions.

This process is repeated for each function that the unit under consideration must perform in order to execute the more frequently used instructions. As a further example, row 2 describes how the Partition Address couple function is performed. In carrying out this step, previously assigned control codes for matrix 40, AU30, SH31, M42, and M43 are used whenever possible; otherwise new control codes are assigned.

Following this step, all of the different control codes and corresponding tasks for each soft structure are tabulated. Then, those tabulated tasks are implemented by a set of contacts in the soft structure. Also, at this point, the actual bits in the control memory can be specified.

In some cases, the number of specialized tasks that are tabulated for a particular soft functional structure may be too large. That is, given various chip size and layout constraints, each soft functional structure will be limited to some finite number of specialized tasks. If that number is exceeded, then those specialized tasks which are used least, are eliminated; and the corresponding code flow is replaced by a sequence of code.

All of the less frequently used instructions are also implemented in a similar manner. That is, they are implemented by using the special purpose codes that are dictated by the more heavily weighted instructions. In this manner, the performance penalty is minimal.

Next, the above sequence of steps is repeated for another sequential logic unit. As an example, one row in FIG. 10 is illustrated as applying to unit 20b. Clearly, the special purpose functions which the soft structures must perform in this unit will be totally different than those that are performed in unit 10e. But, as described above, this total difference in personality between the units is achieved by changing only a single mask.

Various preferred embodiments of the invention have now been described in detail. In addition however, many changes and modifications can be made to these details without departing from the nature and spirit of the invention. Therefore, it is to be understood that the invention is not limited to said details but as defined by the appended claims.

What is claimed is:

1. A digital computer for performing a set of instructions, said digital computer being comprised of:
an array of microprocessors;
each of said microprocessors being characterized as including respective control memory means for storing commands, means for sequentially fetching selectable sequences of said commands, and circuits that perform functions on digital data in response to said fetched commands;
said circuits being characterized as including a plurality of electrical contacts which define said functions that said circuits perform;
said commands and said contacts being chosen differently within the microprocessors such that the microprocessors are adapted to efficiently perform respective parts of the instructions in said set; and
one of said microprocessors having its circuits and command sequences adapted to perform conditional operations without first determining if those conditions exist; and another of said microprocessors having its circuits and command sequences adapted to determine whether said conditions exist and alert said one microprocessor if they do not exist.

2. A digital computer being adapted to perform a set of instructions and being comprised of:
a microprocessor that includes at least two input-output interfaces, a control memory means for storing commands, means for sequentially fetching selectable sequences of said commands, and circuits that perform functions on digital data in response to said commands;
multiple ones of said microprocessors being intercoupled in an array to communicate with each other over multiple buses which couple to said input-output interfaces;
one of said microprocessors being adapted to receive said instructions via said buses and perform conditional operations as specified by said received instructions without first determining if those conditions are satisfied; and
another of said microprocessors being adapted to also receive said instructions in parallel with said one microprocessor, to determine whether said conditions are satisfied, and to alert said one microprocessor if they are not.

3. A digital computer according to claim 1 wherein said circuits include multiple input buses and multiple output buses for digital data, and said contacts interconnect said input buses to said output buses.

4. A digital computer according to claim 1 wherein said circuits include a means for performing arithmetic and logical transformations on corresponding bits of a plurality of data words and said contacts tailor said transformations.

5. A digital computer according to claim 1 wherein said circuits include a means for performing arithmetic and logical transformations on a plurality of addresses for said control memory means and said contacts tailor said transformations.

6. A digital computer according to claim 1 wherein said microprocessors which include said circuits are individually packaged on a single semiconductor chip.

7. A digital computer according to claim 1 wherein said microprocessors which include said circuits are individually packaged on a single semiconductor wafer.

8. A digital computer according to claim 1 wherein said control memory means in said microprocessor is a read-write memory.

9. A digital computer according to claim 1 wherein said control memory means in said microprocessor is a read-only memory.

10. A digital computer according to claim 1 wherein said one and another microprocessors receive said instructions in parallel, and wherein said one and another microprocessors are responsive to each received instruction to fetch and execute different sequences of commands in their respective control memory means which together constitute the execution of that instruction.

* * * * *